United States Patent
Montgomery (10) Patent No.: US 7,535,117 B2
(45) Date of Patent: May 19, 2009

(54) OCEAN WAVE POWER RECOVERY AND CONVERSION SPAR BUOY ENGINE

(76) Inventor: James Scott Montgomery, 4052 Gros Ventre Ave., San Diego, CA (US) 92117

( * ) Notice: Subject to any disclaimer, the term of this patent is extended or adjusted under 35 U.S.C. 154(b) by 37 days.

(21) Appl. No.: 11/764,798

(22) Filed: Jun. 18, 2007

(65) Prior Publication Data

US 2008/0088134 A1 Apr. 17, 2008

Related U.S. Application Data (60) Provisional application No. 60/814,179, filed on Jun. 17, 2006.

(51) Int. Cl.
*F03B 13/10* (2006.01)
(52) U.S. Cl. ............... 290/53; 290/42; 417/331
(58) Field of Classification Search ............ 290/53
See application file for complete search history.

(56) References Cited

U.S. PATENT DOCUMENTS

| | | | | |
|---|---|---|---|---|
| 3,988,592 | A * | 10/1976 | Porter | 290/53 |
| 4,326,840 | A * | 4/1982 | Hicks et al. | 417/331 |
| 4,754,157 | A * | 6/1988 | Windle | 290/53 |
| 4,773,221 | A * | 9/1988 | Noren | 60/501 |
| 4,883,411 | A * | 11/1989 | Windle | 417/331 |
| 5,435,134 | A * | 7/1995 | Nielsen | 60/398 |
| 6,052,334 | A * | 4/2000 | Brumley et al. | 367/90 |
| 6,226,989 | B1 * | 5/2001 | Fredriksson et al. | 60/501 |
| 6,291,904 | B1 * | 9/2001 | Carroll | 290/53 |
| 6,731,019 | B2 * | 5/2004 | Burns et al. | 290/42 |
| 6,768,216 | B1 * | 7/2004 | Carroll et al. | 290/42 |
| 6,791,205 | B2 * | 9/2004 | Woodbridge | 290/53 |
| 6,933,623 | B2 * | 8/2005 | Carroll et al. | 290/42 |
| 7,140,180 | B2 * | 11/2006 | Gerber et al. | 60/496 |
| 7,298,054 | B2 * | 11/2007 | Hirsch | 290/42 |
| 7,323,790 | B2 * | 1/2008 | Taylor et al. | 290/42 |
| 7,362,003 | B2 * | 4/2008 | Stewart et al. | 290/42 |
| 2007/0266704 | A1 * | 11/2007 | Bull et al. | 60/398 |
| 2008/0012344 | A1 * | 1/2008 | Buffard et al. | 290/53 |
| 2008/0088133 | A1 * | 4/2008 | Nagata et al. | 290/53 |

FOREIGN PATENT DOCUMENTS

JP 56157683 A * 12/1981

* cited by examiner

*Primary Examiner*—Joseph Waks
(74) *Attorney, Agent, or Firm*—Spencer Fane Britt & Browne (57) ABSTRACT

A device for capturing power in a wave of a body of water and converting it to useful form. The device includes a housing portion having an opening for receiving flow from a wave in a body of water, and an engine portion within said housing adapted to be acted upon by the flow from the wave, thereby producing electricity. The device also includes at least one float portion to position the device at a desired depth within a body of water.

20 Claims, 12 Drawing Sheets

OCEAN WAVE POWER RECOVERY AND CONVERSION SPAR BUOY ENGINE

CROSS-REFERENCE TO RELATED APPLICATIONS

This application claims benefit of U.S. Provisional Patent Application No. 60/814,179, filed on Jun. 17, 2006 and incorporated herein by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

As societies become more complex and populations grow, the demand for energy is ever-increasing. In modern societies, energy production relies in large part on non-renewable resources such as coal, oil, and natural gas. In addition to existing in finite supply, use of these products leads to formation of pollutants that raise environmental concerns. Burning coal and oil products, for example, leads to airborne pollutants including carbon dioxide. Natural gas, which is often thought to be largely pollutant-free, requires processing prior to use, and this processing produces airborne pollutants as byproducts. Further, the transport of oil and other petroleum products carries within it an inherent risk of pollution due to, for example, a leak in the transport vessel.

Alternate forms of energy production are proposed from time to time, each having various benefits and detriments. Biofuel or biomass energy sources, for example, are often proposed as solutions to the world's energy problems, in part because they represent largely renewable resources. Such fuels suffer from problems, however, in that they produce pollutants in many cases similar to that produced by the use of fossil fuels, and production of sufficient biomass to meet the world's energy demands seems unlikely and can, in some instances, compete directly with resources needed for the world's food supply.

Hydroelectric energy is common in the form of hydroelectric dams, where water from, for example, a river is used to turn turbines or water wheels that are coupled to electrical generators. Such methods, however, may have a considerable environmental impact on the area surrounding the dam, and particularly with respect to the area downstream from the dam.

Nuclear energy holds promise in that the amount of energy produced from a small amount of material is great, and in that there is little or not air pollution produced by a nuclear power plant. Nuclear energy also has certain drawbacks, however, in that dangerous waste is produced and must be disposed of. In addition, uranium mining results in the release of greenhouse gases that lead to environmental concerns.

Wind power is another method that produces no air pollution and is therefore an attractive source of energy production. Such a method, however, is less than desirable in areas where there is no constant source of wind. Furthermore, wind power units are seen as eyesores by many living in areas in which they have been implemented, and the devices have been known to affect bird migratory patterns and to present physical dangers to bird flying near them.

Wave power, on the other hand, is widely available to areas having abundant coastlines, and use of wave power can have a minimal environmental effect. Further, wave power is largely renewable and, as opposed to wind or solar power, is predictable.

What is needed, therefore, is a device for effectively harnessing wave power while at the same time exerting a minimal negative effect on the environment.

SUMMARY OF THE INVENTION

The present invention provides a device for capturing power in a wave of a body of water and converting it to useful form. The device includes a housing portion having an opening for receiving flow from a wave in a body of water, and an engine portion within said housing adapted to be acted upon by the flow from the wave, thereby producing electricity.

In one embodiment of the present invention, the device includes at least one float portion to position the device at a desired depth within a body of water. In another embodiment of the present invention, at least one float portion included with the present device is a spar float.

In another embodiment of the present invention, a receiving portion is associated with the housing portion for increasing the amount of flow from a wave in a body of water received into the present device.

In another embodiment of the present invention, the engine portion is a linear alternator, a linear pump, or a rotary slide crank.

In another embodiment of the present invention, the housing is substantially cylindrical in shape and includes a prime mover piston therein as part of the engine of the device.

In another embodiment of the present invention a weight portion is provided to adjust the depth at which the present device is located within a body of water.

In another embodiment of the present device, an attachment portion is provided to secure the device at a desired location within a body of water.

DETAILED DESCRIPTION OF THE INVENTION

The present invention provides a device including a piston engine capable of recovering usable power from a passing water wave. In a preferred embodiment of the present invention, the wave engine is integrated into the structure of a spar buoy. The device harnesses energy produced from mechanical power in the form of a mass flow field in a wave traveling across a body of water. Particles of water at and below the surface of the water are induced into an approximately elliptical orbit by the passing wave. These particles, taken in mass, are directed along a controlled path by an open cylinder whereupon they perform work in the form of moving a piston. In a preferred embodiment, the present device is provided with a mooring line which serves to moor the device to the bottom surface of a body of water. These and other features of the present invention are described now in more detail.

The various components of the present invention are described in greater detail with reference to FIGS. 5 through 25, below. Various embodiments of the present invention, as well as under underlying principles associated therewith, are now described generally with reference to FIGS. 1 through 4.

Figure 1:
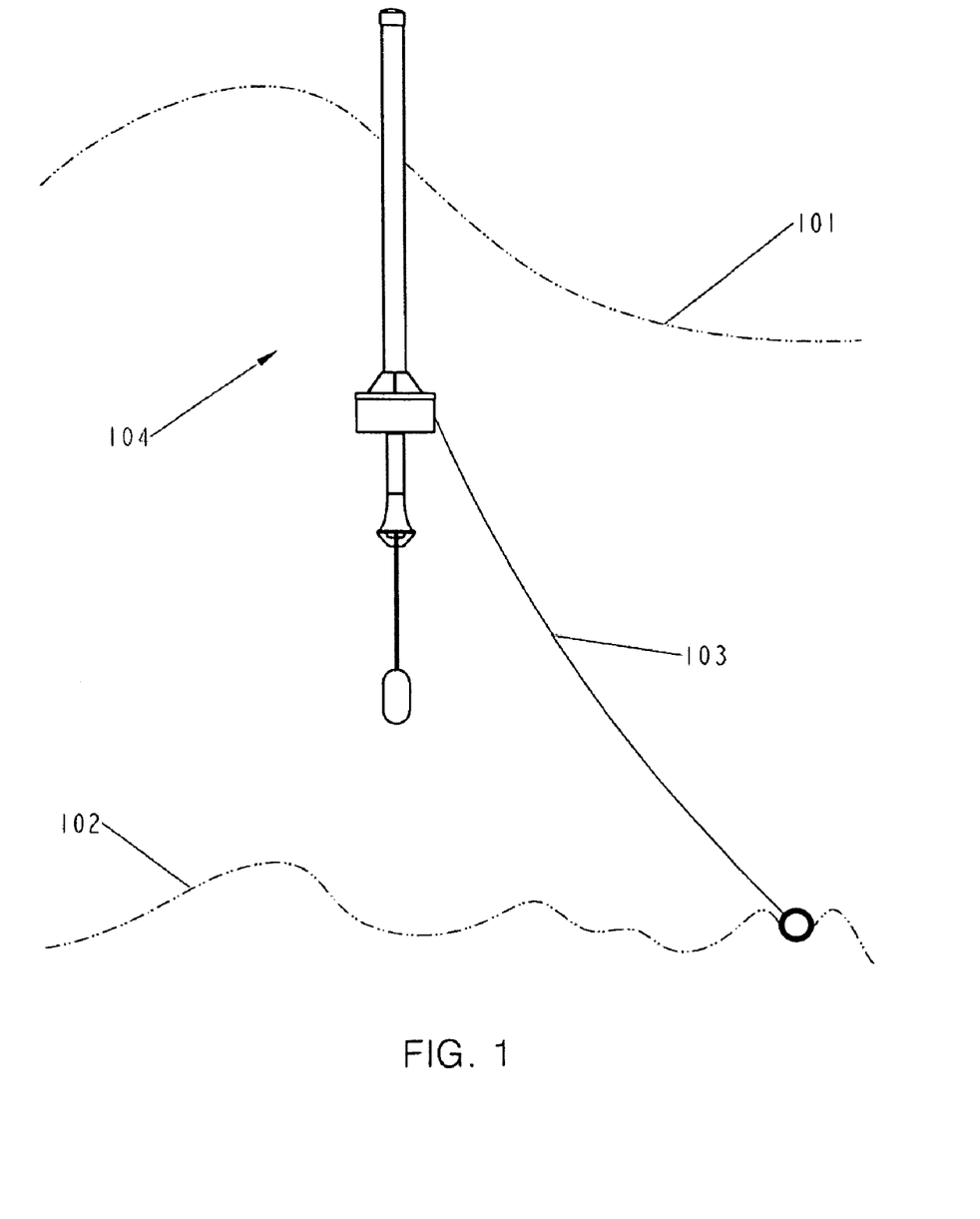
FIG. 1 is a side elevation view of one embodiment of a wave engine device of the present invention adapted for use with a linear alternator.

FIG. 1 provides a schematic illustration of the placement of an exemplary embodiment of a wave engine device 104 in operable position within a body of water. As can be seen from the figure, wave engine device 104 is preferably a free-floating device. An attachment portion, namely mooring line 103, is shown attached to wave engine device 104 and securing it to the bottom surface 102 of the body of water in which wave engine device 104 is being utilized. As is also shown in the figure, a portion of wave engine device 104 is preferably positioned above water line 101, while the remainder of wave engine device 104 is positioned below water line 101. It is contemplated that the arrangement shown in FIG. 1 is but one embodiment of the present invention, and that other embodiments, described below, may also be utilized.

Any suitable means of mooring the present device may be utilized, and the device may occupy any suitable position within a body of water. A free-floating wave engine device 104 is preferably moored to a single point on the bottom of a body of water so that it does not float away from its desired location. The mooring described herein does not contribute significantly to the reaction of wave engine device 104 to a passing wave. It is contemplated that a plurality of wave engine devices 104 may be positioned in an array, with the specific location of each wave engine device 104 determined by currents and the mooring of each device to the bottom of a body of water. It is further contemplated that mooring line 103 may also act as a structural member for electrical energy or plumbing to carry the high-energy product of wave engine device 104 to a central collection point located, for example, on the bottom of the body of water. The product of several wave engine devices 104 can be combined for use at the collection point or at a separate mooring, or for transportation to another location beneath the surface of the water or on shore.

The housing portion of the present device (such as cylinder 115, described below, for example) captures and directs water flow from passing waves into a central axis thereof. The length of the cylinder is sufficient to enclose a prime mover piston over its functional stroke, and to house any required valving or other components described below. The open ends of the cylinder preferably lie below the expected maximum trough depth of a passing wave, such that the open ends remain submerged beneath the surface of a body of water in which wave engine device 104 is placed, but relatively close to the surface thereof. Any wave passing through a body of water in which wave engine device 104 is placed, regardless of wavelength, will impart a field velocity to the water inside of and surrounding the cylinder. In a preferred embodiment of the present invention, the open end of the cylinder is bell or cone shaped, or includes a bell or cone shaped receiving portion attached thereto or formed as a portion thereof, in order to capture a portion of the water's inertia greater than that which would be captured by the cylinder's diameter.

Figure 2:
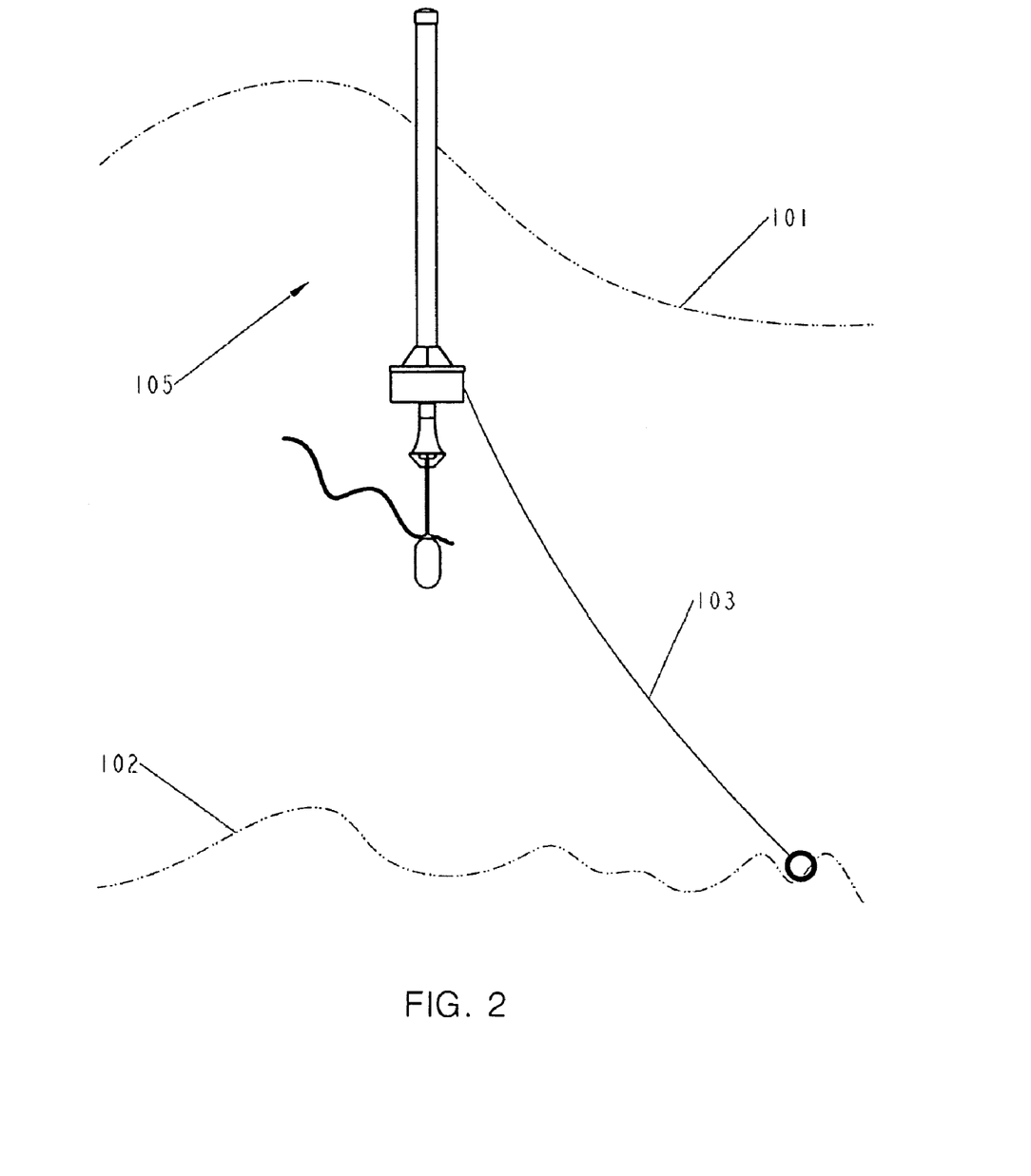
FIG. 2 is a side elevation view of an alternative embodiment of a wave engine device of the present invention adapted for use with a linear pump.
Figure 3:
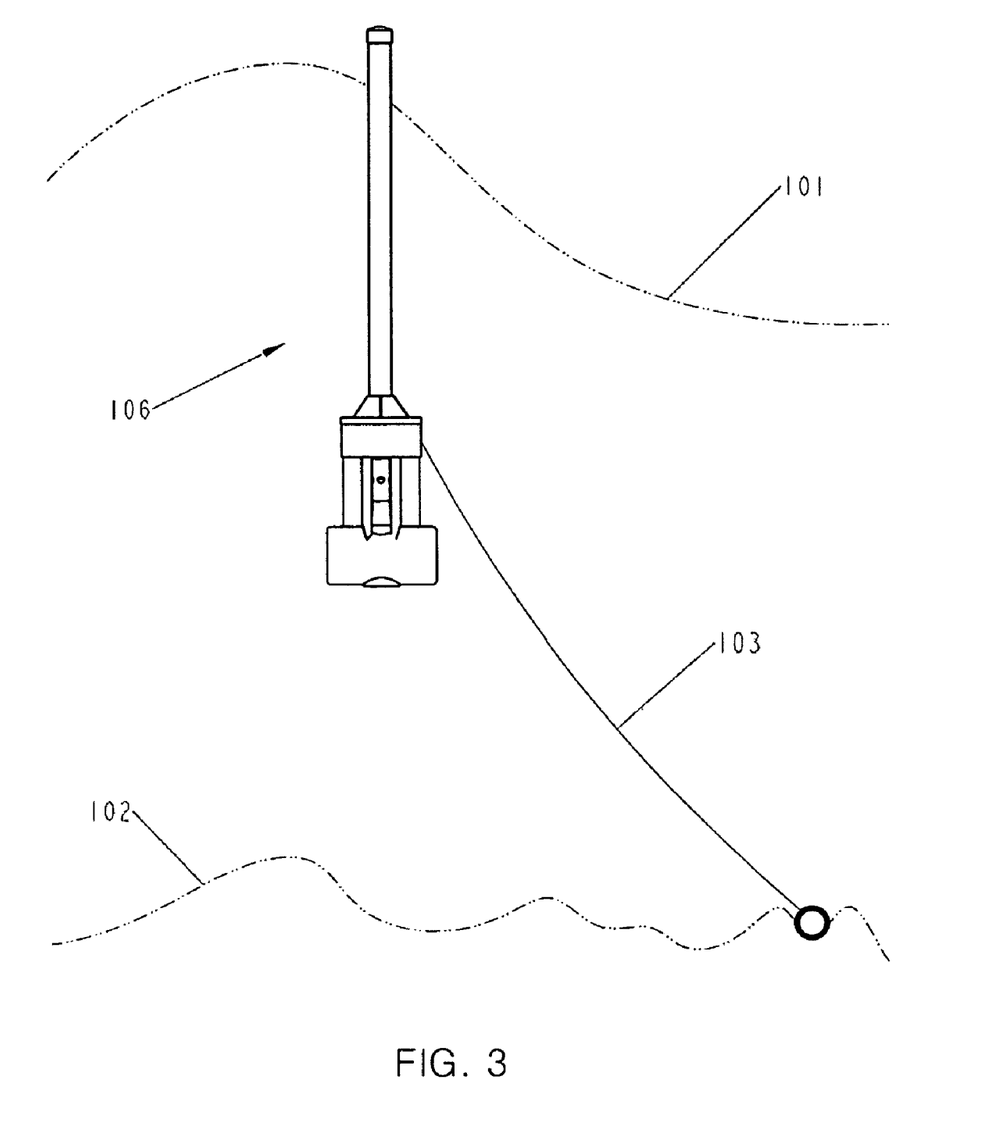
FIG. 3 is a side elevation view of an alternative embodiment of a wave engine device of the present invention adapted for use with a rotary slider-crank engine.

The embodiment of the present invention shown in FIG. 1 is adapted for use with a linear alternator associated therewith. The embodiment of the present invention shown in FIG. 2 is adapted for use with a linear pump associated therewith. FIG. 3 provides an exemplary embodiment of the present device adapted for use with a rotary slider-crank engine.

Figure 4:
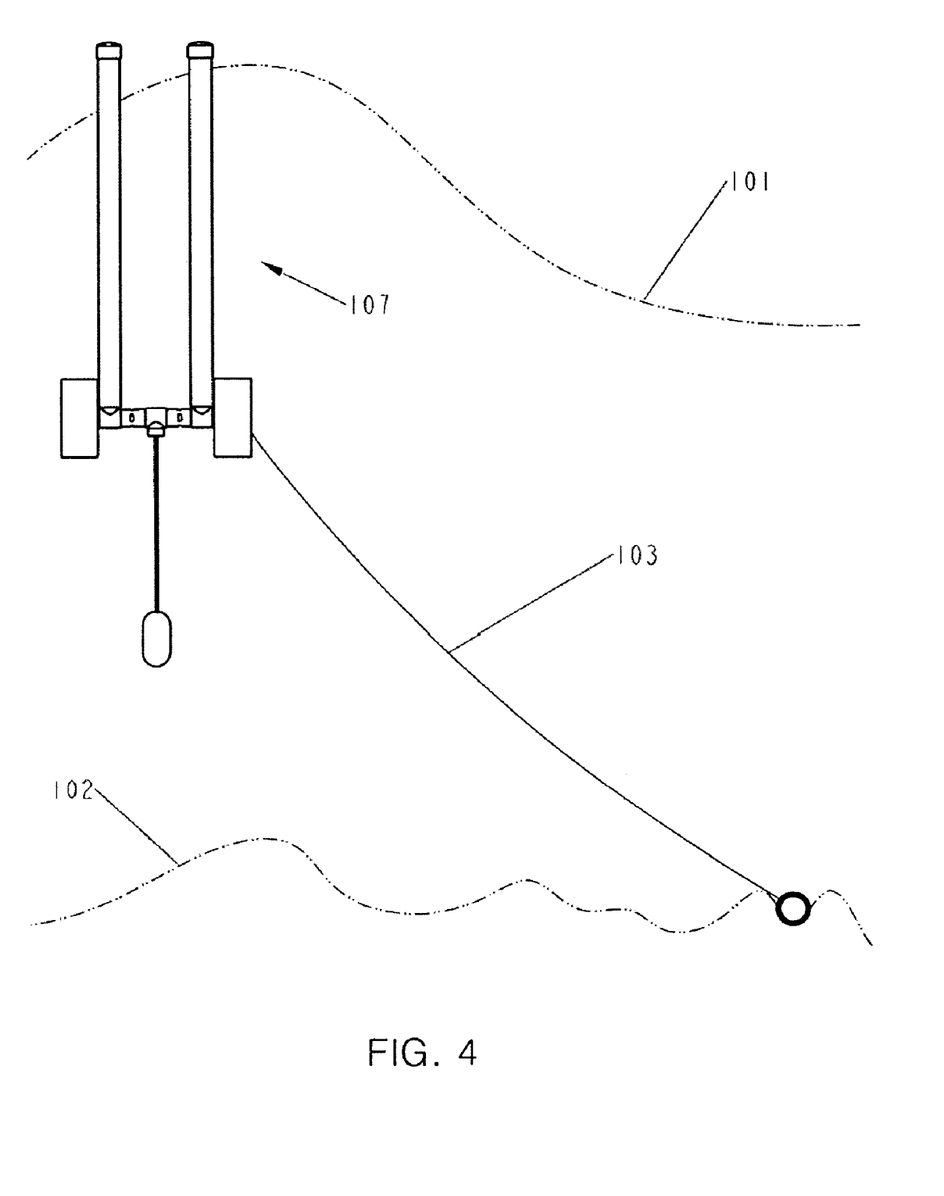
FIG. 4 is a side elevation view of a wave engine device of the present invention having two spar floats associated therewith.

In the embodiment of the present device shown in FIG. 4, the device is adapted for use with a linear pump oriented in a horizontal position. In this embodiment of the present invention, two spar floats are provided for stability. A horizontal cylinder is provided between the spar floats, the cylinder preferably housing a piston therein. Main floats are provided at either end of the cylinder. Despite the horizontal orientation of the cylinder in this embodiment of the present invention, the functionality of the device is substantially similar to that of vertical embodiments described below. It is contemplated, however, that this embodiment of the present invention is able to function effectively near the bottom surface of a body of water, and may also rotate when used near the surface of a body of water, exposing the open ends of the device to a greater amount of flow for a longer period of time, thereby producing a greater amount of energy than a comparable device that is unable to rotate relative to a flow.

The above and other embodiments of the present invention, as well as various components thereof, are now described more fully.

Figure 5:
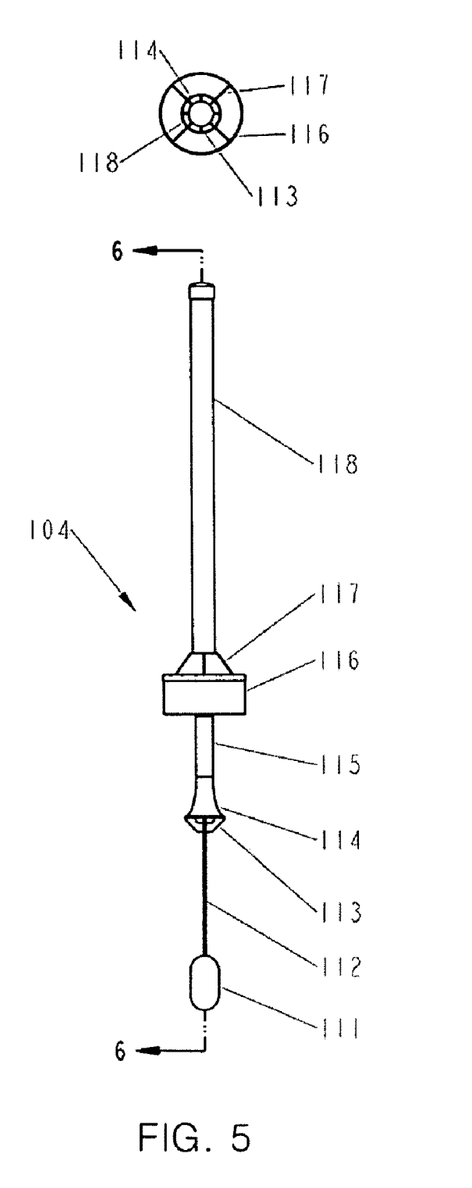
FIG. 5 is a side elevation view of an embodiment of a wave engine device of the present invention adapted for use with a linear alternator and having a top elevation view of the same included therewith.

FIG. 5 provides a side elevation view of a wave engine device 104 constructed in accordance with the teachings of the present invention, as well as a bottom sectional view of bell end 114 thereof. The embodiment of wave engine device 104 shown in FIG. 5 includes various components common to other embodiments of the present invention. As can be seen in the figure, wave engine device 104 preferably includes a bottom weight 111 for adding a desired mass to wave engine device 104 and providing added stability thereto. A weight attachment rod 112 is shown attaching bottom weight 111 to the remainder of wave engine device 104. It is contemplated, however, that any suitable structure for attaching bottom weight 111 to wave engine device 104 may be utilized. The size or mass of weight utilized is variable depending on the desired positioning of wave engine device 104 within a body of water. The same is true of the various floats associated with the present device.

Support baffles 113 are shown in the side elevation view of wave engine device 104 in FIG. 5, as well as in the bottom elevation view of bell end 114 of wave engine device 104, also included in FIG. 5. Baffles 113 are preferably provided with the present device in order to support concentric portions of an integrated power transducer engine (described more fully below).

Bell end 114 is provided in order to direct a greater portion of a wave's flow field into a cylinder 115 of wave engine device 104, whereupon the flow field can act on a piston as described below. While bell end 114 is referred to herein as being bell-shaped, and is shown having a particular configuration in the drawings, it is contemplated that any suitable structure for increasing entry of a wave's flow field into cylinder 115 may be utilized.

Figure 6:
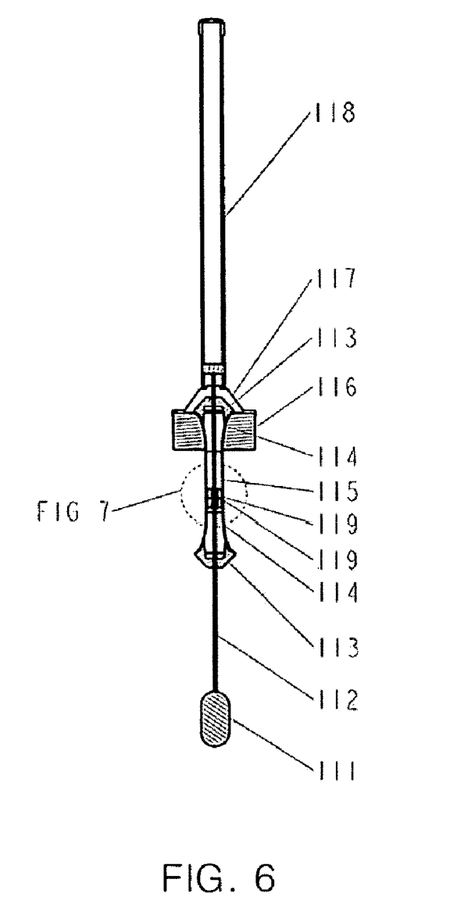
FIG. 6 is a sectional view of the embodiment of a wave engine device shown in FIG. 5.
Figure 7:
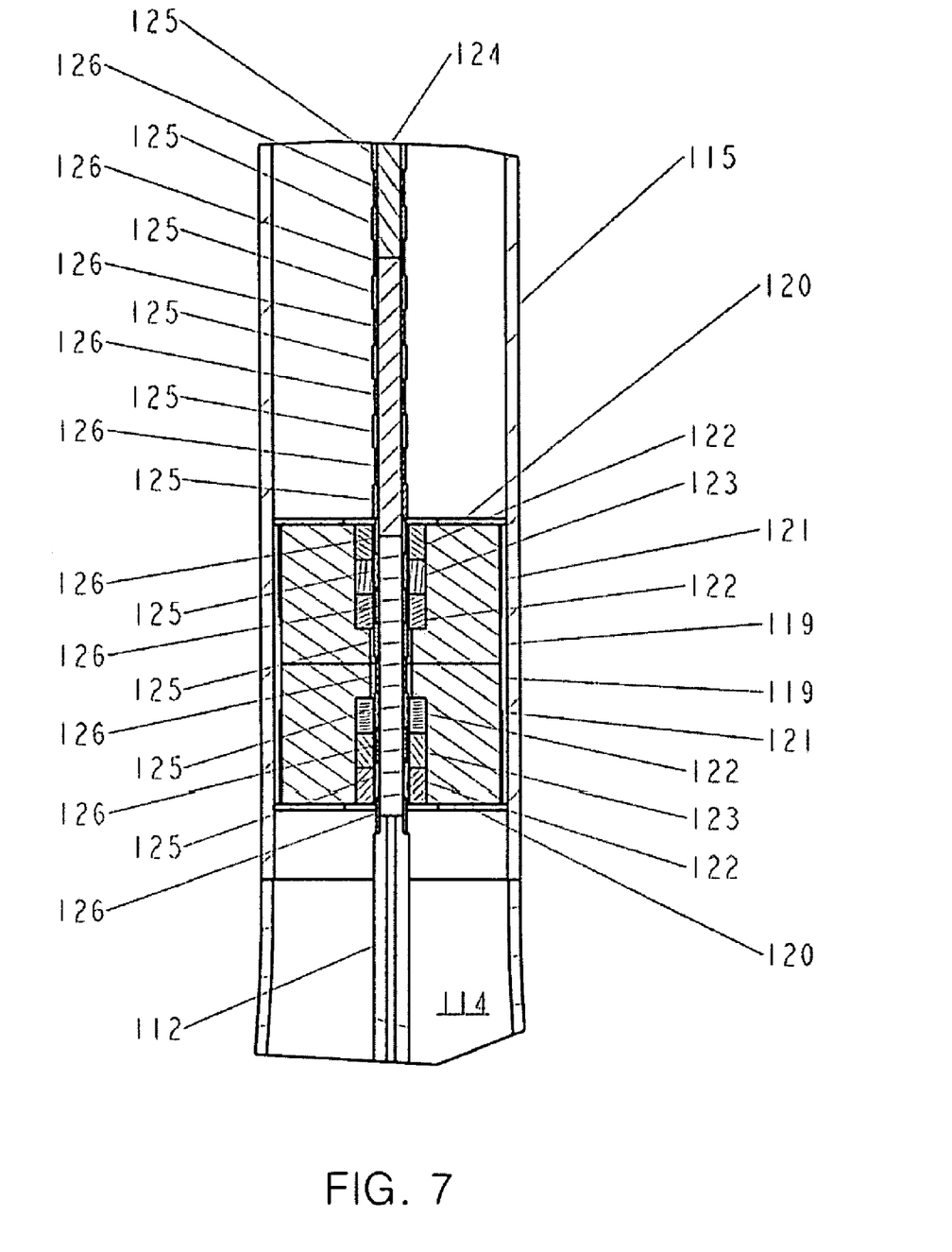
FIG. 7 is a detail view of the embodiment of a wave engine device shown in FIG. 6 depicting an integrated linear alternator transducer portion of the device.

Cylinder 115 includes a central bore along a longitudinal axis thereof and preferably houses a prime mover piston 119 that is adapted to move along a length of the central bore of cylinder 115. As best seen in FIGS. 6 and 7, the ends of cylinder 115 are structured in such a way as to retain piston 119 within the central bore of cylinder 115. Cylinder 115 may be variable in length, although it is contemplated that cylinder 115 should be of a length sufficient to allow piston 119 to move along a useful stroke. Piston 119 is acted on by the momentum of the water in which wave engine device 104 is placed. This momentum causes piston 119 to move with some force, thereby allowing work to be done as a result of this movement. Water inertia is preferably allowed to accumulate by cylinder 115 and prime mover piston 119 before power is taken off from piston 119. Prime mover piston 119 is preferably allowed to travel freely over a small distance while intertia builds before any power is converted, such as by a transducer, into useful form. Piston 119 may be the prime mover for a linear alternator, linear pump, slider crank, or other suitable power take-off mechanism. The work product of wave engine device 104 can take the form, for example, of power stored in a rotating flywheel, increased hydraulic pressure of a working fluid, intensified pressure of seawater to facilitate desalination, or directly as electrical energy from an integral alternator generator. Power in these forms is easily convertible by known methods and can be put to a variety of uses.

A valve is preferably provided at the end of the stroke of piston 119 within cylinder 115 in order to allow excess water to be diverted around piston 119 at the end of the piston's useful stroke. Alternatively piston 119 may be stopped beyond a straight, cylindrical portion of cylinder 115 in order to allow excess water to flow around piston 119 without affecting piston 119.

A main float 116 is preferably provided to provide buoyancy to wave engine device 104, although it is preferred that the buoyancy provided by main float 116 is insufficient to cause wave engine device 104 to float to the surface of a body of water. Additional buoyancy is provided by a spar float 118 that preferably pierces the surface of the water and also allows wave engine device 104 to maintain a substantially vertical position with respect to a longitudinal axis of cylinder 115. A spar bracket 117 may be provided to more effectively secure spar float 118 to the rest of the device. Because of the relatively small cross-section of spar float 118, changes in the depth of wave engine device 104 caused by passing waves do not significantly affect the buoyancy of wave engine device 104. Wave engine device preferably floats vertically in a body of water and does not respond to passing waves by rapidly changing its position with respect to the bottom of the body of water. This is due to the fact that wave engine device 104 has a naturally long heave period relative to that of a passing wave and this natural low frequency of the device allows it to remain largely immune to the effects of a passing wave. With respect to an observer of wave engine device 104, the device remains approximately stationary.

FIG. 6 provides a sectional view of the wave engine device 104 shown in FIG. 5, showing the internal prime mover piston 119, shown in two adjacent sections (both of which are indicated by the numeral 119). FIG. 6 also shows the various components of wave engine device 104 described with respect to FIG. 5, above.

FIG. 7 provides a detailed view of prime mover piston 119 as housed within cylinder 115. In the detailed view provided in FIG. 7, the embodiment of wave engine device 104 shown includes an integrated linear alternator transducer. The integrated linear alternator transducer is a component of the engine of the device, which includes piston 119, piston seals 120, antifriction material 121, large torroidal magnetic conductors 122, torroidal permanent magnets 123, cylinder 115, rod magnetic conductor 124, torroidal copper wire coils 125, and small torroidal magnetic conductors 126.

A piston subassembly 110 such as that shown in FIG. 7 (and more specifically identified in FIG. 8) preferably contains one or more phases or magnetic circuits. The magnetic circuit (or phase) may include, for example, two large torroidal magnet conductors 122 on each side of a torroidal magnet 123, the large torroidal magnet conductors 122 being in physical contact with torroidal magnet 123 and mounted concentrically in each of the sections of piston 119. In a preferred embodiment of wave engine device 104, each phase is separated by a distance equal to an integer multiple of the distance between torroidal coils 125, plus that distance divided by the number of piston subassembly phases. The length 108 of the linear alternator transducer is less than the travel available to prime mover piston subassembly 110. The linear alternator consists of a series of poles at a regular distance mounted on rod magnetic conductor 124. Each linear alternator pole is made by a torroidal wire core 125 mounted over rod magnetic conductor 124 and separated by small torroidal conductors 126.

Figure 8:
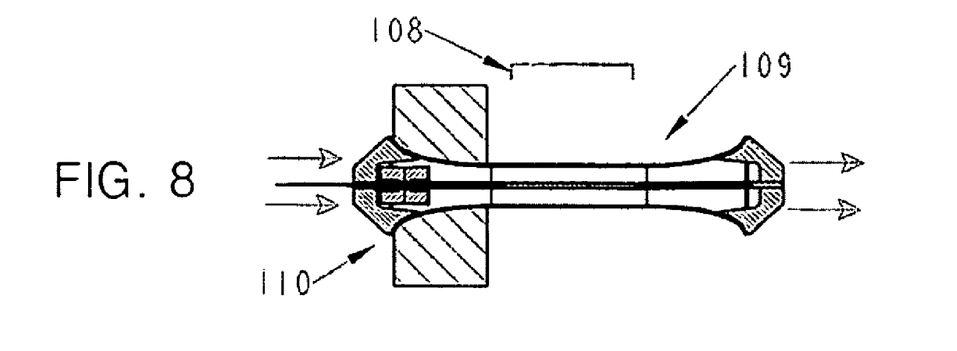
FIGS. 8 through 11 depict a portion of a cycle of a wave engine device of the present invention having a linear alternator integrated therein.
Figure 9:
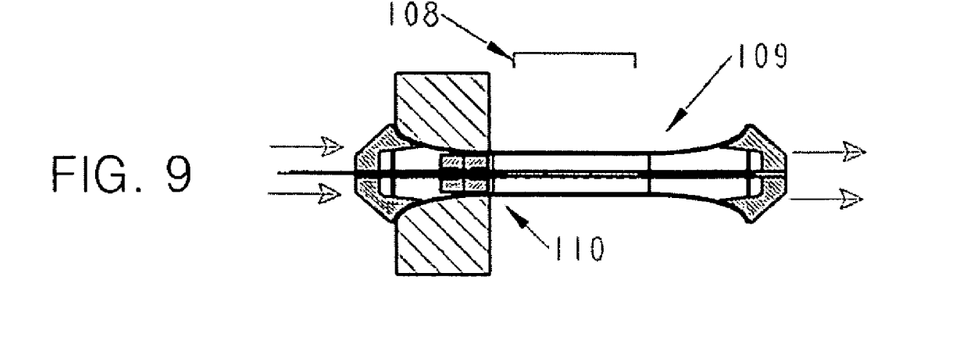
Figure 10:
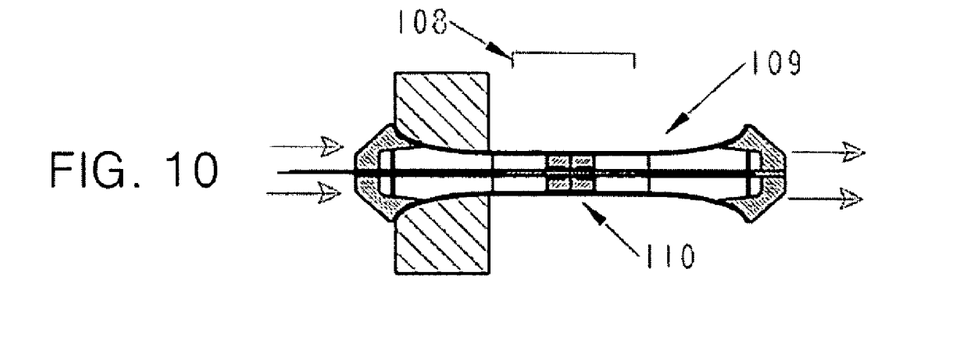
Figure 11:
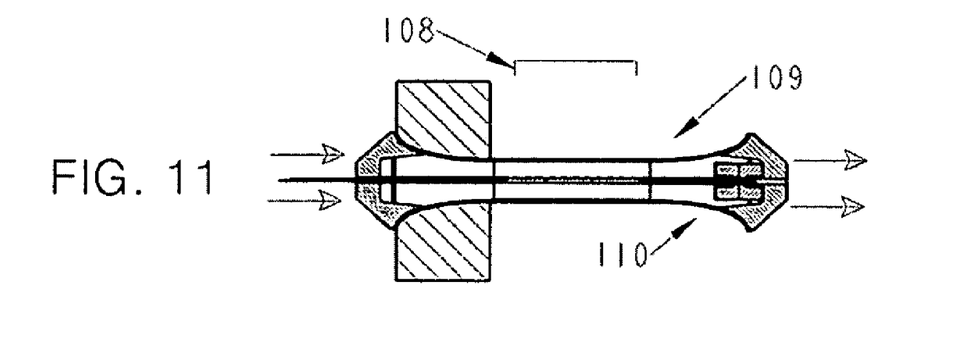

Turning now to FIG. 8 through 11, a series depicting one half of the linear alternator integrated spar buoy engine's operating cycle is shown. These figures depict the functionality of wave engine device 104 when an approximately sinusoidal wave passes in the water around the wave engine device 104, creating an analogous subsurface flow field. Initially, wave the active components of wave engine device 104 are arranged as shown in FIG. 8; the piston subassembly 110, which includes two sections of piston 119, piston seals 120, antifriction material 121, large torroidal magnetic conductors 122, and permanent torroidal magnets 123, is at the top of its limit of travel. Water flows into a top portion 109 of the fluid conducting portion of wave engine device 104. Piston subassembly 110 is free to move without engaging length 108 of the linear alternator region of wave engine device 104. After traveling some distance, as shown in FIG. 9, inertia is present at prime mover piston subassembly 110 and the subassembly can begin to enter length 108 of wave engine device 104, containing a linear alternator of the device, to create electrical potential and current. In FIG. 10, prime mover piston subassembly 110 is fully engaged in the linear alternator located in length 108 of the present device, and is producing usable power. Electrical power emerges from the alternator's poles, is rectified by diode bridge or other suitable method known in the art (not shown), and all poles' outputs are summed together for use (not shown). FIG. 11 shows prime mover piston subassembly 110 after it has traveled beyond length 108 of the present device containing the linear alternator transducer. Prime mover piston subassembly 110 preferably moves into a bell end 114 where the fluid conductor becomes significantly larger than the diameter of piston 119 and fluid is allowed to pass around piston subassembly 110 without creating substantial force on the surface of piston 119. The wave's flow field reverses itself during the second half of wave. With reversal of the wave's flow field, piston subassembly 110 is forced to travel in the opposite direction, completing the engine's cycle and awaiting another wave to begin the cycle again.

Figure 12:
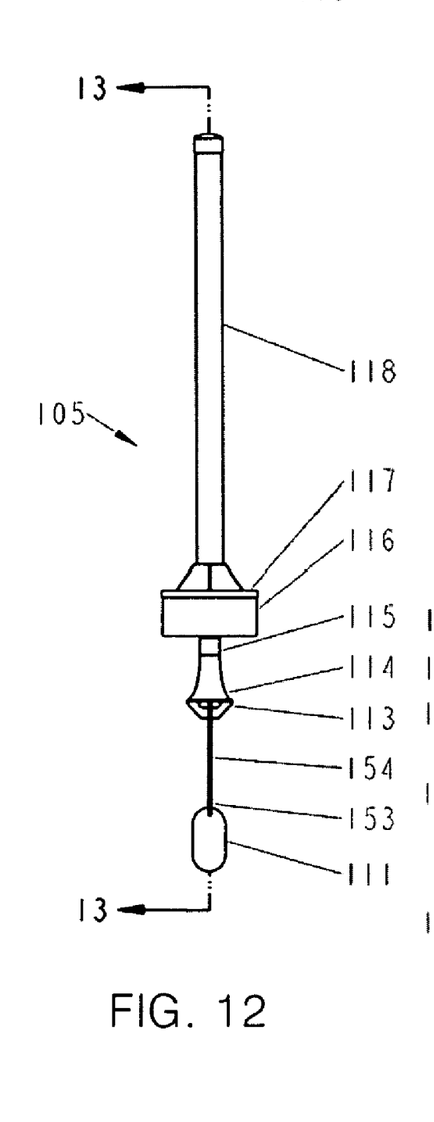
FIG. 12 is a side elevation view of an embodiment of a wave engine device of the present invention adapted for use with a linear pump and having a top elevation view of the same included therewith.

FIG. 12 shows both side and top elevation views of the external components of an embodiment of the present wave engine device 105 having an integrated linear pump with piston overtravel valving. Bottom weight 111 is provided, as are dual check valve 153, secondary pump cylinder 154, support baffles 113, bell end 114, cylinder 115, main float 116, spar bracket 117, and spar float 118. The components of the embodiment of wave engine device shown in FIG. 12 that are present in the embodiments of the present device previously described function in substantially the same manner as described above. Other components of this embodiment of wave engine device 104 are described more fully below.

Figure 13:
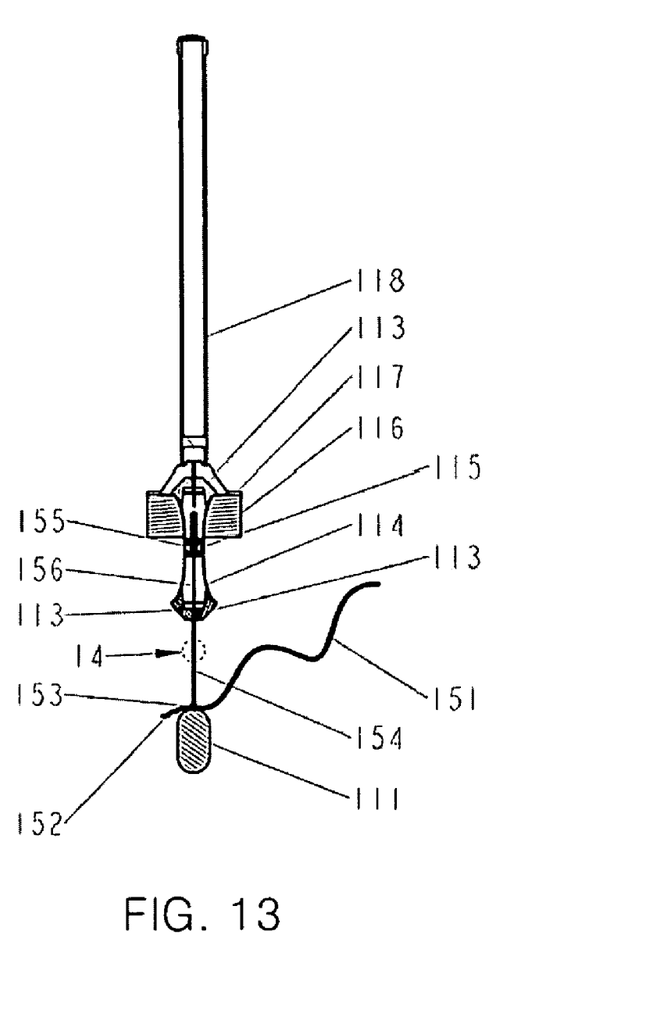
FIG. 13 is a sectional view of the embodiment of a wave engine device shown in FIG. 12.
Figure 14:
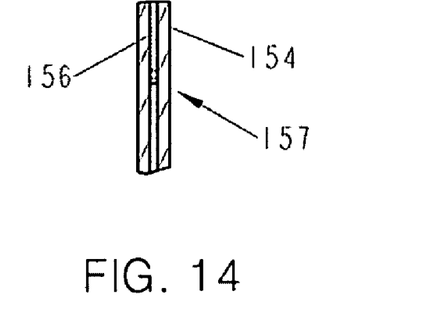
FIG. 14 is a detail view of the embodiment of a wave engine device shown in FIG. 13.

FIG. 13 is a sectional view of the embodiment of wave engine device 105 shown in FIG. 12 and described briefly above. An inlet fluid connector 151 is directly attached to dual check valve 153, allowing working fluid to pass in one direction (inlet to outlet) only. An outlet connector 152 and secondary pump cylinder 154 are connected between check valve elements (not shown), and a plunger 156 is connected by a yoke to prime mover piston 155. The diameter of plunger 156 is preferably smaller than that of prime mover piston 115, causing the development of a greater pressure in secondary pump cylinder 154 than is experienced by prime mover piston 155. Pressure in secondary cylinder 154 is retained by seals 157 present on an end of plunger rod 156. Pressurized working fluid is allowed to flow to outlet connectors 52 by dual check valve 153. FIG. 14 provides a detailed view of seals 157 located at an end of plunger 156 inside secondary pump cylinder 154.

Figure 15:
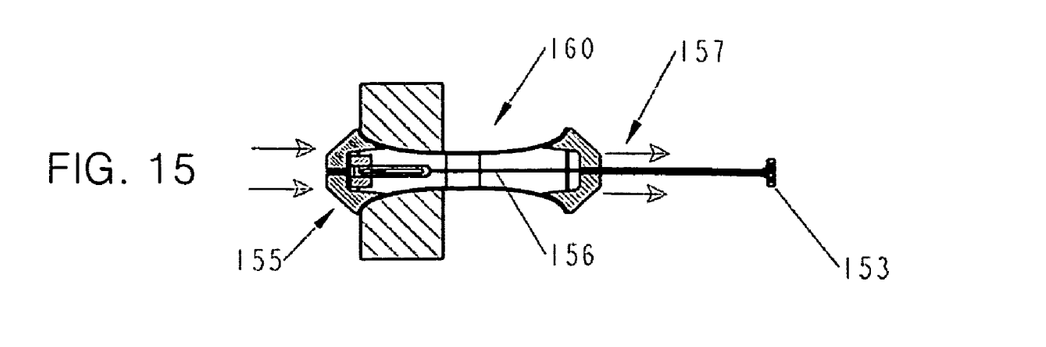
FIGS. 15 through 18 depict a portion of a cycle of a wave engine device of the present invention having a linear pump associated therewith.
Figure 16:
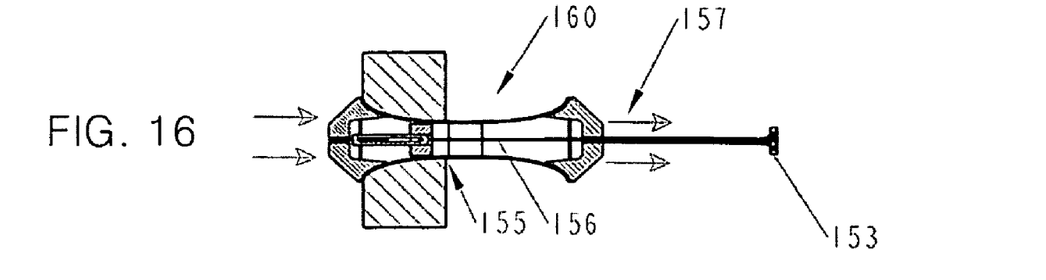
Figure 17:
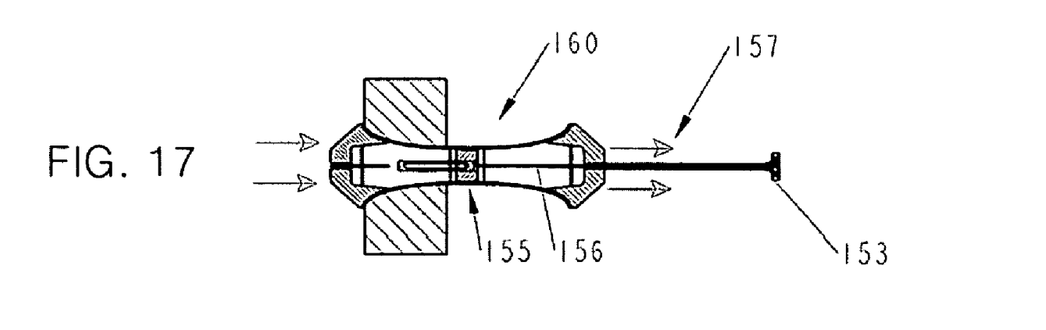
Figure 18:
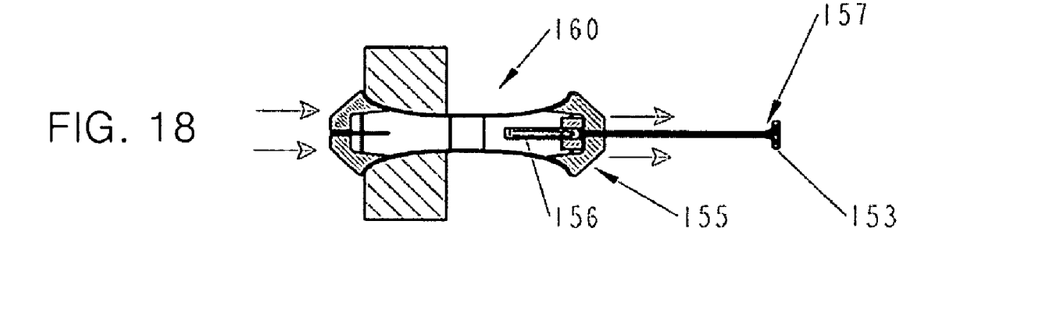

FIGS. 15 through 18 provide a series depicting one half of the operating cycle of the embodiment of wave engine device 105 shown in FIGS. 12 through 14 (i.e. an embodiment of the present device having an integrated linear pump provided therein). These figures depict the functionality of wave engine device 105 when an approximately sinusoidal wave passes in the water around the wave engine device 105, creating an analogous subsurface flow field. Initially, the active components of wave engine device 105 are arranged as shown in FIG. 15, with piston 155 at the top of its limit of travel. Water flows into a top portion 160 of the fluid conducting portion of wave engine device 105. Piston 155 is free to move within a slot housing plunger 156 without engaging plunger 156. After traveling some distance as shown in FIG. 16, inertia is present at prime mover piston 155 and it reaches the end of the slot housing plunger 156, causing plunger 156 to begin to move. In FIG. 17 prime mover piston 155 is acting on plunger 156 to create pressure in secondary cylinder 154, below plunger seals 157. FIG. 18 shows prime mover piston 155 after it has traveled to the end of its useful stroke. Prime mover piston 155 is moved into a bell end 114 where the fluid conductor becomes significantly larger than the diameter of piston 155 and fluid is allowed to pass around prime mover piston 155 without creating substantial force on the surface of piston 155. The wave's flow field reverses itself during the second half of wave. With reversal of the wave's flow field, piston 155 is forced to travel in the opposite direction, completing the cycle of wave engine device 105 and awaiting another wave to begin the cycle again.

Figure 19:
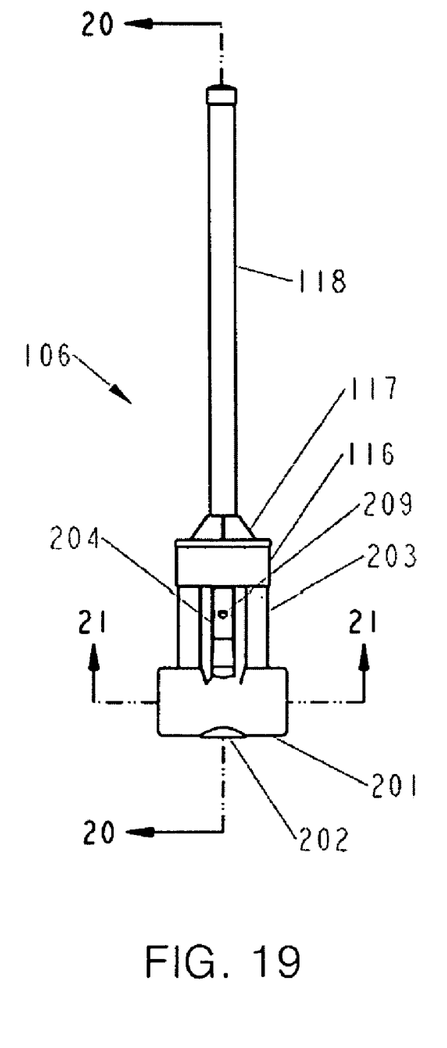
FIG. 19 is a side elevation view of an embodiment of a wave engine device of the present invention adapted for use with slider crank and having a top elevation view of the same included therewith.

FIG. 19 provides side and top elevation views of the external components of an embodiment of wave engine device 106 having an integrated slider crank portion with piston port valving. Shown in FIG. 19 are crankcase 201, cylinder bell extension 202, support struts 203, cylinder 204, cylinder ports 209 main float 116, spar bracket 117, and spar float 118.

Figure 20:
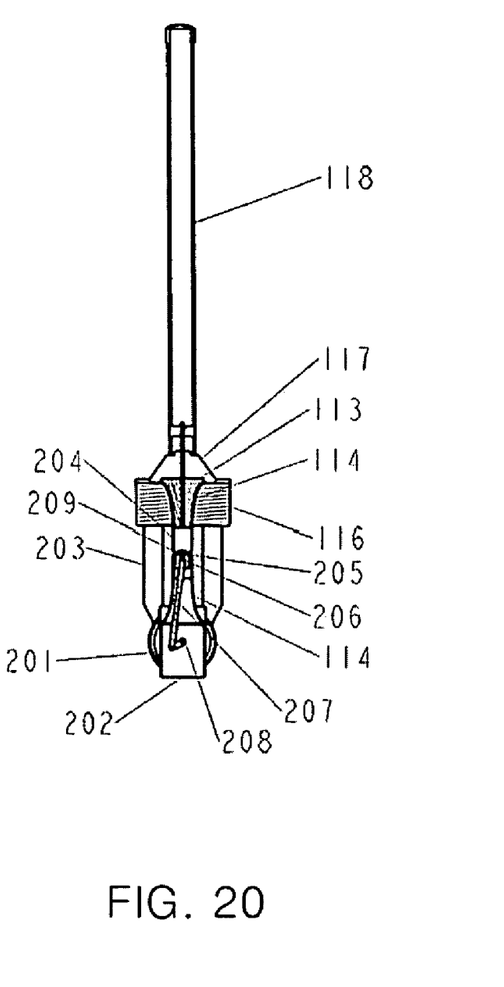
FIG. 20 is a sectional view of the embodiment of a wave engine device shown in FIG. 19.

FIG. 20 provides a sectional view of wave engine device 106 having a slider crank integrated therein. Components are analogous to a typical external combustion slider crank engine arrangement. A piston 205 fits closely inside of a cylinder 204 and is connected by a wrist pin 206 to a connecting rod 207. The connecting rod in turn acts upon a crankshaft 208.

Figure 21:
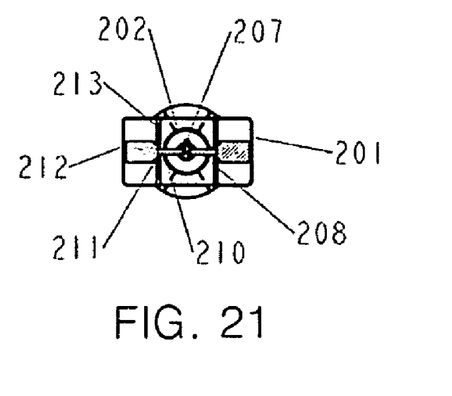
FIG. 21 is a detail view of the embodiment of a wave engine device shown in FIG. 20.

As shown in FIG. 21, crankshaft 208 is supported by a crankcase 201 with rotary seals 210 prohibiting intrusion of water into the crankcase volume. A sprag (a one way rotation device) is preferably incorporated into internal support bearings 211, which support crankshaft 208. A flywheel 213 and rotary input machine 212 are also preferably connected to the crankshaft by a sprag (not shown).

Figures 22, 23:
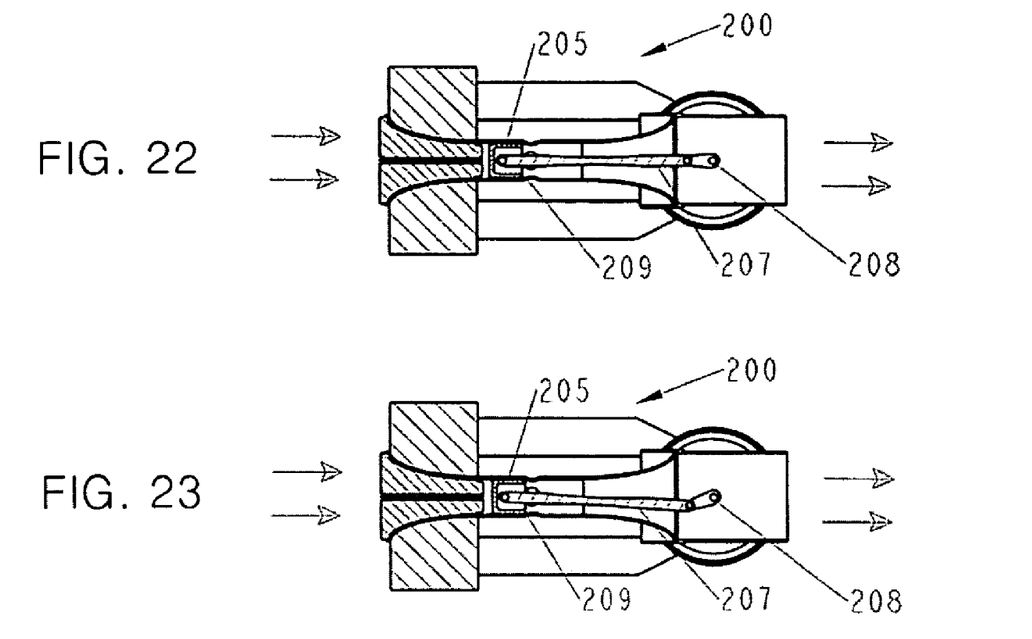
FIGS. 22 through 25 depict a portion of a cycle of a wave engine device of the present invention having a slider crank associated therewith.
Figure 24:
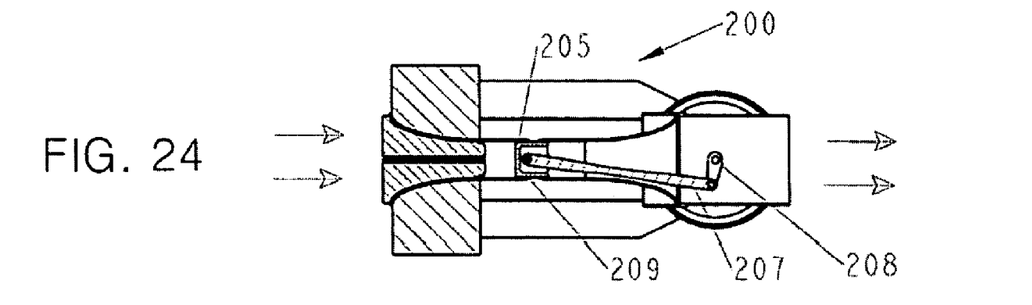
Figure 25:
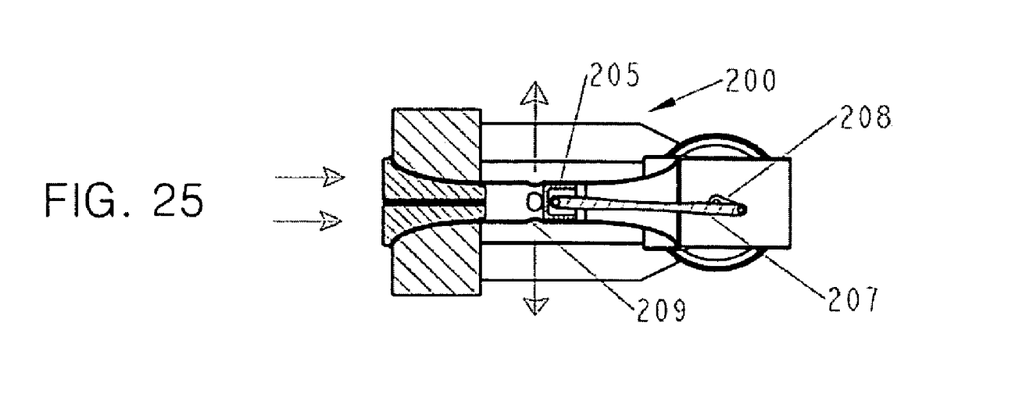

FIGS. 22 through 25 provide a series depicting one half of the operational cycles of a wave engine device 106 having a slider crank integrated therewith. These figures depict the functionality of wave engine device 106 when an approximately sinusoidal wave passes in the water around the wave engine device 106, creating an analogous subsurface flow field. During the initial portion of the cycle, the active components of wave engine device 106 are arranged as shown in FIG. 22. Piston 205 is at the top of its limit of travel and water is flowing into a top portion 200 of a fluid conducting portion of wave engine device 106. It is assumed for purposes of this illustration that flywheel 213 is rotating due to the influence of previous waves. FIG. 23 depicts prime mover piston 205 as moving down due to the flowing water, thereby imparting rotation to crankshaft 208 via connecting rod 207. As piston 205 is accelerated down its path by incoming water, accumulating inertia as it moves, the rotation rate of crankshaft 208 will approach that of flywheel 213. FIG. 24 illustrates the position of piston 205 when the rotation speed of crankshaft 208 overtakes that of flywheel 213, whereupon energy is stored in flywheel 213. Power is preferably continually taken from flywheel 213 by rotational input machine 212. As shown in FIG. 25, as the wave half passes and the rotational speed of crankshaft 208 slows, energy stored in flywheel 213 remains, less what is consumed by rotational input machine 212. Piston 205 is moved beyond the cylinder's ports 204 and any flowing water is allowed to flow out of the path of piston 20. The wave's flow field reverses itself during the second half of wave. With reversal of the wave's flow field, piston 205 is forced to travel in the opposite direction, completing the cycle of wave engine device 106 awaiting another wave to begin the cycle again.

Figure 26:
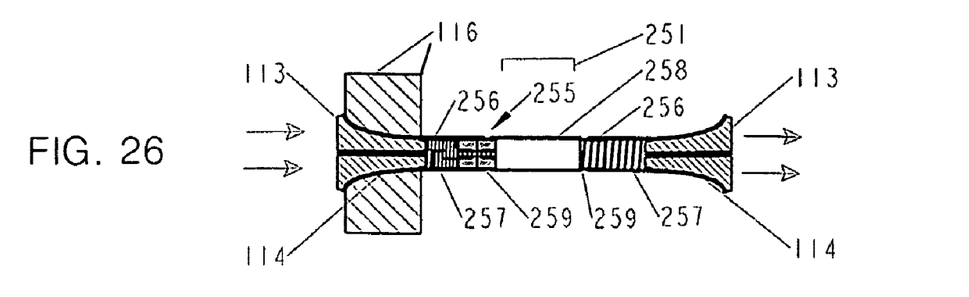
FIGS. 26 through 28 depict a portion of a cycle of a wave engine device of the present invention having slide valves associated therewith.
Figure 27:
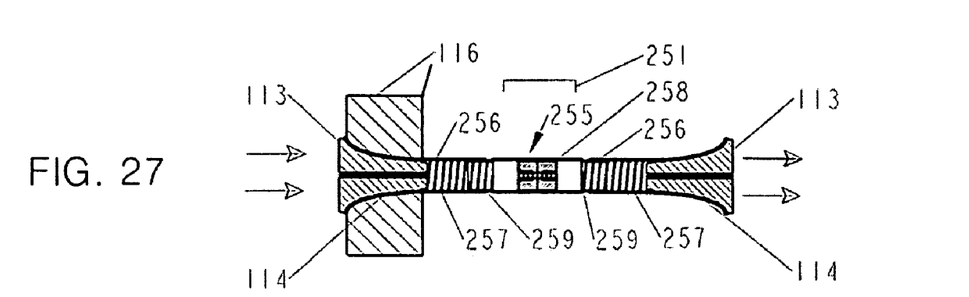
Figure 28:
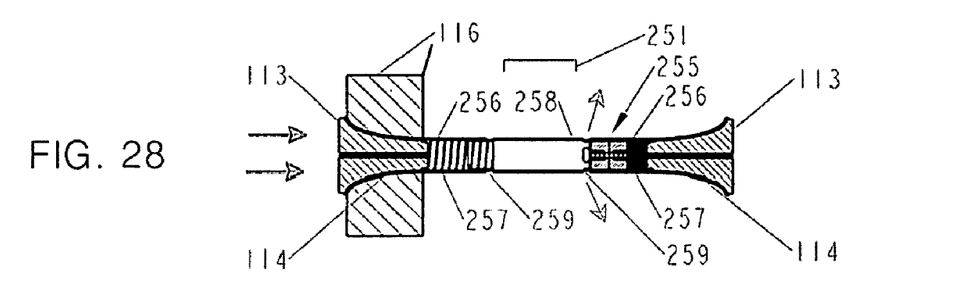
Figure 29:
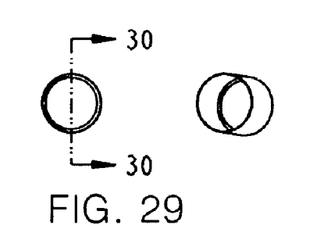
FIGS. 29 through 31 provide detail views of a hollow slider of the embodiment of the present device depicted in FIGS. 26 through 28.
Figures 30, 31:
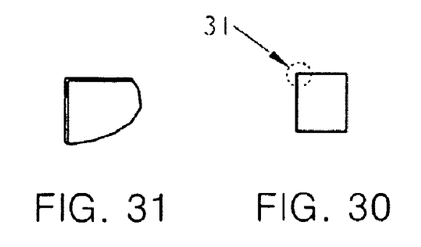

FIGS. 26 through 28 provide a series depicting one half of an operating cycle of an embodiment of wave engine device 104 having slide valves operable associated therewith. As with the series describe above, these figures depict the functionality of this embodiment of wave engine device 104 when an approximately sinusoidal wave passes in the water around the wave engine device 104, creating an analogous subsurface flow field. Initially, the active components of this embodiment of wave engine device 104 are arranged as shown in FIG. 26. Piston 255 is near the top of its limit of travel and water is flowing into a top portion of the fluid conducting portion the wave engine device, past top slider 257 and spring 256 to act on prime mover piston 255. Top cylinder ports 259 are covered by prime mover piston 255, which is moving down cylinder 258 and accumulating inertia before engaging power transducer region 251. FIG. 27 shows prime mover piston 255 moving in power transducer region 251 of the wave engine device 104. Slider 257 has moved to cover side port 259 by spring 256 and water is flowing down cylinder 258. The hollow slider 257 is shown in detail in FIGS. 29 through 31. In the state of the present device shown in FIG. 27, power is being transferred to power transducer 251 by prime mover piston 255. Prime mover piston 255 has reached the end of its useful stroke at the point illustrated in FIG. 28 and has moved slider 256 back, compressing spring 257. Piston 255 has moved beyond the cylinder's port 259, and water which would normally act on piston 255 is diverted out of the ports.

Although specific embodiments of the present invention are described above, those embodiments are meant to be illustrative of the broad teachings of the present invention. Engine and valve arrangements described above, for example, are illustrative and the present invention is not intended to be limited to the engine and valve combinations described above. Various other combinations will be apparent to those of skill in the art upon reading this disclosure. Further, although the various embodiments of wave engine device 104 are described and depicted herein as being substantially vertical when placed in operable position, it is contemplated that embodiments of wave engine device 104 may be provided in a horizontal orientation, or oriented at any other suitable angle.

Likewise, the present invention is not limited to any specific materials for use in construction of the invention, and any suitable materials may be used for the various structures and functionalities described herein. Antifriction materials suitable for use with the present device may include, for example, materials constructed from synthetic polymers, synthetic copolymers, carbon fiber materials, silicon-based materials, graphite materials, metals materials such as titanium nitride-based materials, and the like, as well as combinations thereof.

The detailed description set forth above is provided to aid those skilled in the art in practicing the present invention. The invention described and claimed herein, however, is not to be limited in scope by the specific embodiments disclosed because these embodiments are intended to be illustrative of several aspects of the invention. Any equivalent embodiments are intended to be within the scope of the present invention. Various modifications of the invention which do not depart from the spirit or scope of the present invention, in addition to those shown and described herein, will become apparent to those skilled in the art from the foregoing description. Such modifications are also intended to fall within the scope of the appended claims.

The invention claimed is:

1. A device for capturing power in a wave of a body of water and converting it to useful form, the device comprising:
   a) a housing portion, said housing portion having at least one opening for receiving flow from a wave of a body of water; and
   b) an engine portion operably positioned within said housing portion, said engine portion adapted to generate electricity upon engagement of flow from said wave of said body of water with said engine,
   wherein said housing portion remains substantially vertically stationary within said body of water during operation of said device; and
   a float portion fixedly attached to said housing portion for positioning said device at a depth within said body of water, wherein said float portion is a spar float.

2. The device according to claim 1 further comprising a float portion fixedly attached to said housing portion for positioning said device at a depth within said body of water.

3. The device according to claim 2 wherein said float portion is a spar float.

4. The device according to claim 1 further comprising a receiving portion fixedly attached to said housing portion at the at least one opening thereof, said receiving portion having a diameter greater than that of said housing portion for receiving flow from said wave of said body of water and directing said flow into said housing portion.

5. The device according to claim 1 wherein said engine portion is selected from the group consisting of a linear alternator, a linear pump, and a rotary slide crank.

6. A device for capturing power in a wave of a body of water and converting it to useful form, the device comprising:
   a) a housing portion, said housing portion having first and second ends, said first end of said housing portions having an opening for receiving flow from a wave of a body of water;
   b) a main float portion fixedly attached to a second end of said housing portion;
   c) a spar float portion fixedly attached to said main float portion; and
   d) an engine portion operably positioned within said housing portion, said engine portion adapted to generate electricity upon engagement of flow from said wave of said body of water with said engine,
   wherein said housing portion remains substantially vertically stationary within said body of water during operation of said device.

7. The device according to claim 6 further comprising a receiving portion fixedly attached to said first end of said housing portion, said receiving portion having a diameter greater than that of said housing portion for receiving flow from said wave of said body of water and directing said flow into said housing portion.

8. The device according to claim 7 wherein said receiving portion is a bell-shaped portion.

9. The device according to claim 7 further comprising a weight portion fixedly attached to said receiving portion for maintaining said device at a depth within said body of water.

10. The device according to claim 6 further comprising an attachment portion removably attached to said main float portion for securing said device at a location within said body of water.

11. The device according to claim 6 wherein said housing portion is positioned substantially horizontally within said body of water and further comprising a second spar float portion for providing stability to said device.

12. The device according to claim 6 wherein said housing is substantially cylindrical in shape and further wherein said engine comprises a prime mover piston adapted to move within said housing when said prime mover piston engages flow from said wave of said body of water.

13. The device according to claim 12 wherein said engine portion is selected from the group consisting of a linear alternator, a linear pump, and a rotary slide crank.

14. The device according to claim 12 wherein said housing further comprises a transducer region and wherein during operation of said device said prime mover piston moves substantially freely along a portion of a useful stroke thereof in order to accumulate inertia prior to entering said transducer region.

15. The device according to claim 12 wherein said housing further includes a valve at a second end thereof to direct water away from said prime mover piston at the end of a useful stroke thereof.

16. The device according to claim 12 wherein a natural heave period of said device is lower than that of a wave of a body of water in which said device is positioned, and further wherein a period of said prime mover piston is faster than that of said wave, such that said device is substantially insensitive to a passing wave's natural period.

17. The device according to claim 6 wherein said engine portion further comprises slide valves in operable engagement therewith.

18. A device for capturing power in a wave of a body of water and converting it to useful form, the device comprising:
   a) a cylindrical housing portion, said housing portion having first and second ends, said first end of said housing portions having an opening for receiving flow from a wave of a body of water;
   b) a main float portion fixedly attached to a second end of said housing portion;
   c) a spar float portion fixedly attached to said main float portion;
   d) an engine portion operably positioned within said housing portion, said engine portion adapted to generate electricity upon engagement of flow from a wave of a body of water with said engine and comprising a prime mover piston adapted to move within said housing when said prime mover piston engages flow from said wave of said body of water;
   e) a receiving portion fixedly attached to said first end of said cylindrical housing portion, said receiving portion having a diameter greater than that of said housing portion for receiving flow form said wave of said body of water and directing said flow into said housing portion; and
   f) a weight portion fixedly attached to said receiving portion for maintaining said device at said depth within said body of water
   wherein said housing portion remains substantially vertically stationary within said body of water during operation of said device.

19. The device according to claim 18 wherein said engine portion is selected from the group consisting of a linear alternator, a linear pump, and a rotary slide crank.

20. The device according to claim 18 further comprising an attachment portion for attaching said device to a bottom surface of said body of water in which said device is positioned.

* * * * *